United States Patent
Moon et al.

(10) Patent No.: US 8,619,996 B2
(45) Date of Patent: Dec. 31, 2013

(54) APPARATUS AND METHOD FOR TRANSMITTING DIGITAL MULTIMEDIA BROADCASTING DATA, AND METHOD AND APPARATUS FOR RECEIVING DIGITAL MULTIMEDIA BROADCASTING DATA

(75) Inventors: Han-gil Moon, Seoul (KR); Kyung-sun Cho, Seoul (KR); Hyun-wook Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 393 days.

(21) Appl. No.: 12/858,677

(22) Filed: Aug. 18, 2010

(65) Prior Publication Data

US 2011/0047379 A1    Feb. 24, 2011

(30) Foreign Application Priority Data

Aug. 18, 2009   (KR) .................. 10-2009-0076339

(51) Int. Cl.
    *H04H 20/47*    (2008.01)
(52) U.S. Cl.
    USPC ............... 381/2; 380/275; 380/276; 380/236; 381/17; 381/18; 381/19

(58) Field of Classification Search
    USPC ................... 380/275–276, 236; 381/2, 17–19
    See application file for complete search history.

(56) References Cited

U.S. PATENT DOCUMENTS

| | | | |
|---|---|---|---|
| 2001/0053222 A1* | 12/2001 | Wakao et al. | 380/43 |
| 2006/0023706 A1* | 2/2006 | Varma et al. | 370/389 |
| 2007/0058951 A1* | 3/2007 | Kashiwagi et al. | 386/124 |
| 2010/0278512 A1* | 11/2010 | Ryu et al. | 386/239 |
| 2010/0322429 A1* | 12/2010 | Norvell et al. | 381/22 |

* cited by examiner

*Primary Examiner* — Yin-Chen Shaw
*Assistant Examiner* — Roderick Tolentino
(74) *Attorney, Agent, or Firm* — Sughrue Mion, PLLC (57) ABSTRACT

Provided are a method and apparatus for transmitting digital multimedia broadcasting data, and a method and apparatus for receiving digital multimedia broadcasting data. A basic audio signal and a multichannel audio signal are encoded to generate a basic audio stream and a multichannel audio stream, and a first data stream describing property and position data of the basic audio stream and a second data stream describing property and position data of the multichannel audio stream are transmitted as independent streams. According to the performance of the receiving apparatus, an audio signal may be decoded by using just the first data stream only or both the first data stream and the second stream.

28 Claims, 11 Drawing Sheets

APPARATUS AND METHOD FOR TRANSMITTING DIGITAL MULTIMEDIA BROADCASTING DATA, AND METHOD AND APPARATUS FOR RECEIVING DIGITAL MULTIMEDIA BROADCASTING DATA

CROSS-REFERENCE TO RELATED PATENT APPLICATION

This application claims priority from Korean Patent Application No. 10-2009-0076339, filed on Aug. 18, 2009 in the Korean Intellectual Property Office, the disclosure of which is incorporated herein by reference in its entirety.

BACKGROUND

1. Field of the Present General Inventive Concept

Apparatuses and methods consistent with the present general inventive concept relate to a digital multimedia broadcasting system, and more particularly, to an apparatus and method for transmitting digital multimedia broadcasting data that provides a multichannel audio service, and an apparatus and method for receiving the digital multimedia broadcasting data.

2. Description of the Related Art

With the development of digital signal processing technology, the quality of multimedia provided through communication networks or broadcasting networks is increasing all the time. For example, public broadcasting services have been provided by black-and-white TVs, color TVs, and digital TVs, and now image services are provided with high definition (HD) quality. Such a trend is also evident in audio services which have been provided in mono and then in stereo, and now with multiple channels.

A digital multimedia broadcasting (DMB) service is a multimedia service which can be received by a user while moving from one place to another, and is provided via a terminal device such as a mobile phone, a personal data assistant (PDA), or a receiver device for cars. Currently, terrestrial DMB services provide image data having a resolution of 320×240 and stereo audio data. As the demand of users for high quality multimedia services is increasing, a method of providing high quality audio data which is compatible with previous digital multimedia broadcasting systems is required.

SUMMARY

One or more exemplary embodiments of the present general inventive concept provide an apparatus and method for efficiently transmitting a multichannel audio signal that is compatible with a conventional digital multimedia broadcasting system, and an apparatus and method for receiving a multichannel audio signal.

According to an aspect of the present general inventive concept, there is provided a transmitting apparatus for transmitting digital multimedia broadcasting data, incuding an audio encoding unit which encodes a basic audio signal and a multichannel audio signal to generate a basic audio stream and a multichannel audio stream; a data stream generating unit which generates a first data stream describing property and position data of the basic audio stream and a second data stream describing property and position data of the multichannel audio stream; and a transmitting unit which packetizes, multiplexes and transmits the basic audio stream, the multichannel audio stream, the first data stream, and the second data stream.

According to another aspect of the present general inventive concept, there is provided a method of transmitting digital multimedia broadcasting data, the method including encoding a basic audio signal and a multichannel audio signal to generate a basic audio stream and a multichannel audio stream; generating a first data stream describing property and position data of the basic audio stream and a second data stream describing property and position data of the multichannel audio stream; and packetizing, multiplexing, and transmitting the basic audio stream, the multichannel audio stream, the first data stream, and the second data stream.

According to another aspect of the present general inventive concept, there is provided a receiving apparatus for receiving digital multimedia broadcasting data, the apparatus including a receiving unit which extracts a first data stream describing property and position data of a basic audio stream and a second data stream describing property and position data of a multichannel audio stream by demultiplexing and depacketizing a transport stream; a data stream decoding unit which decodes the first data stream and the second data stream to extract property and position data of the basic audio stream and property and position data of the multichannel audio stream; and an audio decoding unit fwhich decodes the basic audio stream and the multichannel audio stream by using the property and position data of the basic audio stream and the property and position data of the multichannel audio stream.

According to another aspect of the present general inventive concept, there is provided a method of receiving digital multimedia broadcasting data, the method including extracting a first data stream describing property and position data of a basic stream and a second data stream describing property and position data of a multichannel audio stream by demultiplexing and depacketizing a transport stream; decoding the first data stream and the second data stream to extract property and position data of the basic audio stream and property and position data of the multichannel audio stream; and decoding the basic audio stream and the multichannel audio stream by using the property and position data of the basic audio stream and the property and position data of the multichannel audio stream.

According to the present general inventive concept, a multichannel audio service that is compatible with previous digital multimedia broadcasting systems can be provided.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

Exemlary emobidmetns of the present general inventive concept will now be described more fully with reference to the accompanying drawings, in which exemplary embodiments of the present general inventive concept are shown. The inventive concept may be embodied in various forms without being limited to the exemplary embodiments set forth herein. Also, descriptions of well-known parts may be omitted for clarity.

Figure 1:
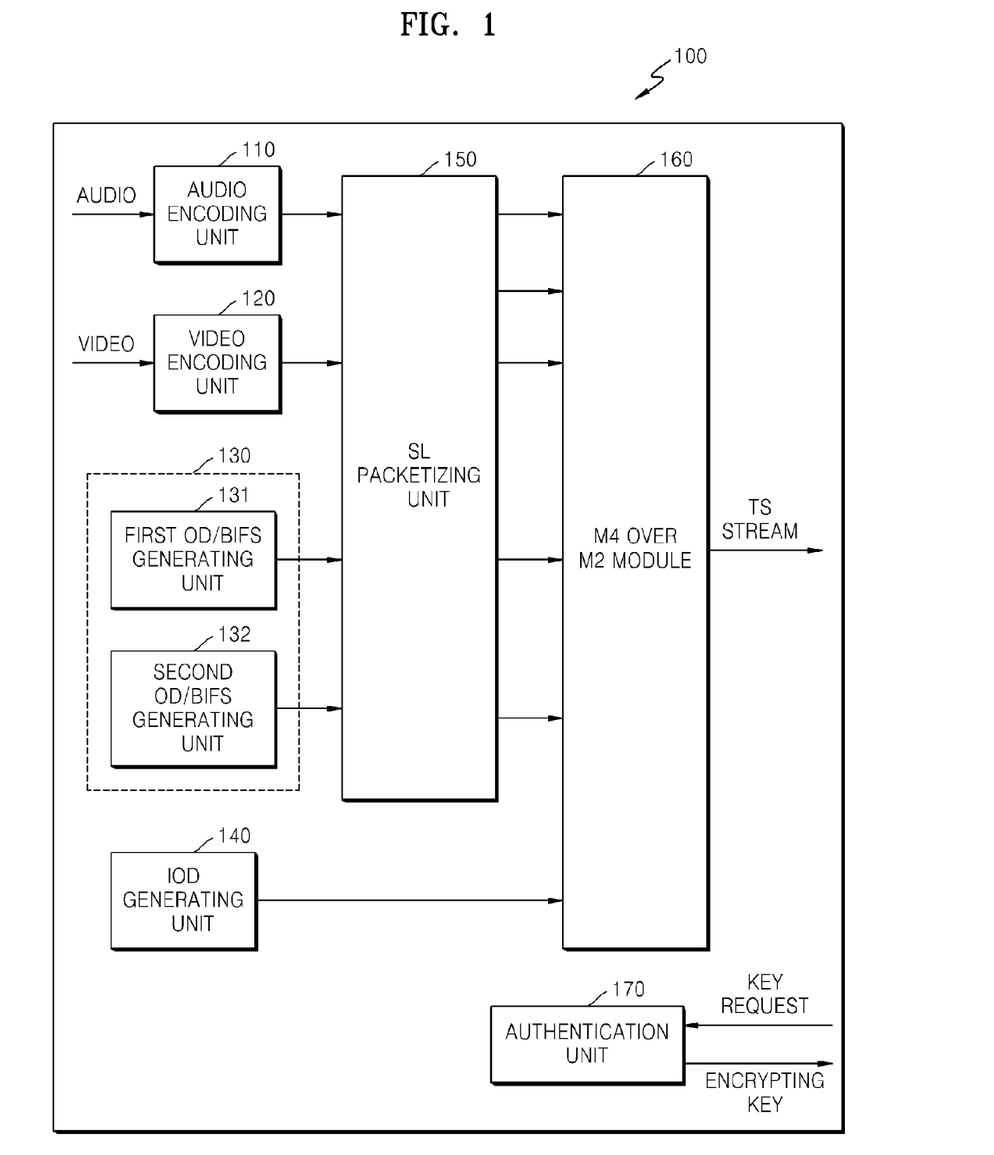
FIG. 1 is a block diagram illustrating a transmitting apparatus of a digital multimedia broadcasting service, according to an exemplary embodiment of the present general inventive concept.

FIG. 1 is a block diagram illustrating a transmitting apparatus 100 for digital multimedia broadcasting, according to an exemplary embodiment of the present general inventive concept.

Referring to FIG. 1, the transmitting apparatus 100 for digital multimedia broadcasting according to the present exemplary embodiment includes an audio encoding unit 110, a video encoding unit 120, an object descriptor (OD)/binary format for screens (BIFS) generating unit 130, an initial object descriptor (IOD) generating unit 140, an synchronization layer (SL) packetizing unit 150, an M4 over M2 module 160, and an authentication unit 170.

The audio encoding unit 110 encodes a received audio signal in a moving picture experts group (MPEG)-4 bit sliced arithmetic coding (BSAC) format.

Figure 2A:
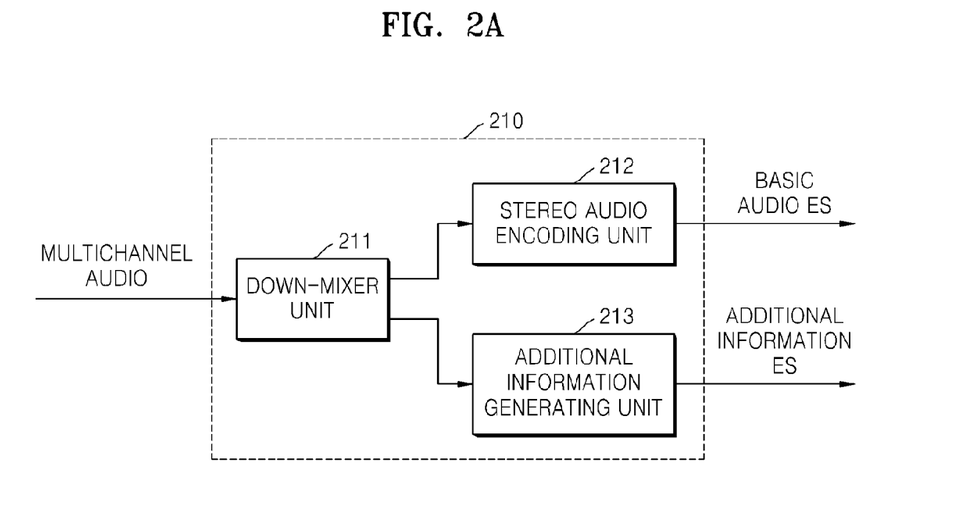
FIG. 2A is a block diagram illustrating an audio encoding unit according to an exemplary embodiment of the present general inventive concept.

FIG. 2A is a block diagram illustrating an audio encoding unit 210 according to an exemplary embodiment of the present general inventive concept.

Referring to FIG. 2A, the audio encoding unit 210 includes a down mixer unit 211, a stereo audio encoding unit 212, and an additional information generating unit 213.

The down mixer unit 211 receives a multichannel audio signal to generate a stereo audio signal. For example, when a 5.1 channel audio signal, that is, six multichannel signals consisting of left (L), surround left (Ls), center (C), sub woofer (Sw), right (R), and surround right (Rs), is received, the down mixer unit 211 down-mixes the 5.1 channel audio signal into a 2-channel stereo signal consisting of left channel (L) and right channel (R).

The stereo audio encoding unit 212 encodes the 2-channel stereo signal that is output from the down mixer unit 211, thereby generating a basic audio elementary stream (ES), and the additional information generating unit 213 encodes additional information for restoring a multichannel audio signal, from the 2-channel stereo signal thereby generating additional information ES. The additional information may include information for determining an intensity of multichannel audio signals that are down-mixed and information on difference in phases between the down-mixed multichannel audio signals.

Figure 2B:
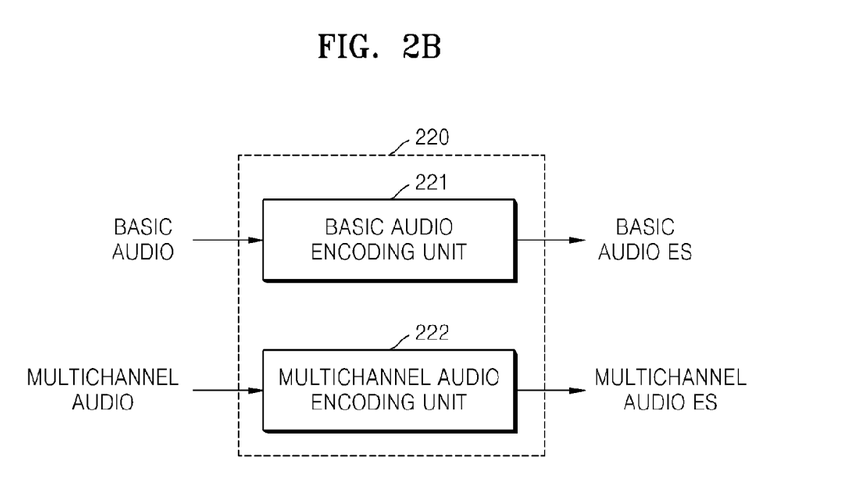
FIG. 2B is a block diagram illustrating an audio encoding unit according to another exemplary embodiment of the present general inventive concept.

FIG. 2B is a block diagram illustrating an audio encoding unit 220 according to another exemplary embodiment of the present general inventive concept. The audio encoding unit 210 illustrated in FIG. 2A down-mixes a received multichannel audio signal to generate and encode additional information for restoring the stereo audio signal and the multichannel audio signal. On the other hand, the audio encoding unit 220 illustrated in FIG. 2B respectively encodes a basic audio signal and a multichannel audio signal, thereby generating a basic audio ES and a multichannel ES. In detail, referring to FIG. 2B, the audio encoding unit 220 includes a basic audio encoding unit 221 which encodes a basic audio signal, thereby generating a basic audio ES, and a multichannel audio encoding unit 222 which encodes a multichannel audio signal, thereby generating a multichannel audio ES. The additional information ES of FIG. 2A and the multichannel audio ES of FIG. 2B are both related to encoded multichannel audio signals, and thus both will be hereinafter referred to as a multichannel audio stream.

Referring to FIG. 1, the video encoding unit 120 encodes a video signal, thereby generating a video ES.

The OD/BIFS unit 130 includes a first OD/BIFS generating unit 131 which generates a first data stream describing property and position data of a basic audio stream and a second OD/BIFS generating unit 132 which generates a second data stream describing property and position data of a multichannel audio stream.

In general, in digital multimedia broadcasting, an audio signal and a video signal are defined using one object, respectively, and a plurality of object description (OD) streams and BIFS streams may be used. OD streams are data streams describing information on one audio object. For example, according to TTAS.KO-07.0051, which is a terrestrial Digital Multimedia Broadcast (DMB) standard, two OD streams and three BIFS streams may be used at most with respect to any one object. Accordingly, the OD/BIFS generating unit 130 generates two different OD streams such that property and position data of a basic audio stream is described in the first OD stream and property and position data of a multichannel audio stream is described in the second OD stream. Also, as will be described later with reference to FIG. 4, a second elementary stream descriptor included in the second OD stream is constructed to be subordinate to a first elementary stream descriptor, and thus, an object descriptor with respect to one audio object may be generated by combining the first OD stream and the second OD stream.

Also, since the first OD stream and the second OD stream are transmitted independently, if they are received in a receiving apparatus that is not capable of processing a multichannel audio signal, a basic audio signal can still be encoded by using the first elementary stream descriptor included in the first OD stream, even when the second OD stream cannot be processed. Thus, compatibility for reproducing an audio signal including a multichannel audio signal provided according to the present general inventive concept can be guaranteed even in a conventional digital multimedia broadcasting receiving apparatus.

The IOD generating unit 140 generates an IOD stream by using IOD text data received from an outside source and outputs the same. IOD is a first access point of all relevant streams, and identifies an elementary stream ID (ES_ID) of an OD or a BIFS, and the OD identifies an ES_ID constructing an object, and objects are distributed using the BIFS.

The SL packetizing unit 150 receives a basic audio stream, a multichannel audio stream, a first OD/BIFS encoding stream, and a second OD/BIFS encoding stream, and packetizes each of the same as an SL packet. The above-described OD/BIFS generating unit 130, the IOD generating unit 140, and the SL packetizing unit 150 may generate relevant data according to a MPEG-4 standard (e.g., ISO/IEC 14496-1).

The M4 over M2 module 160 multiplexes the IOD streams and the streams that are packetized by the SL packetizing unit 150 according to a MPEG-4 format, thereby multiplexing a transport stream (TS) according to a MPEG-2 format.

Figure 3:
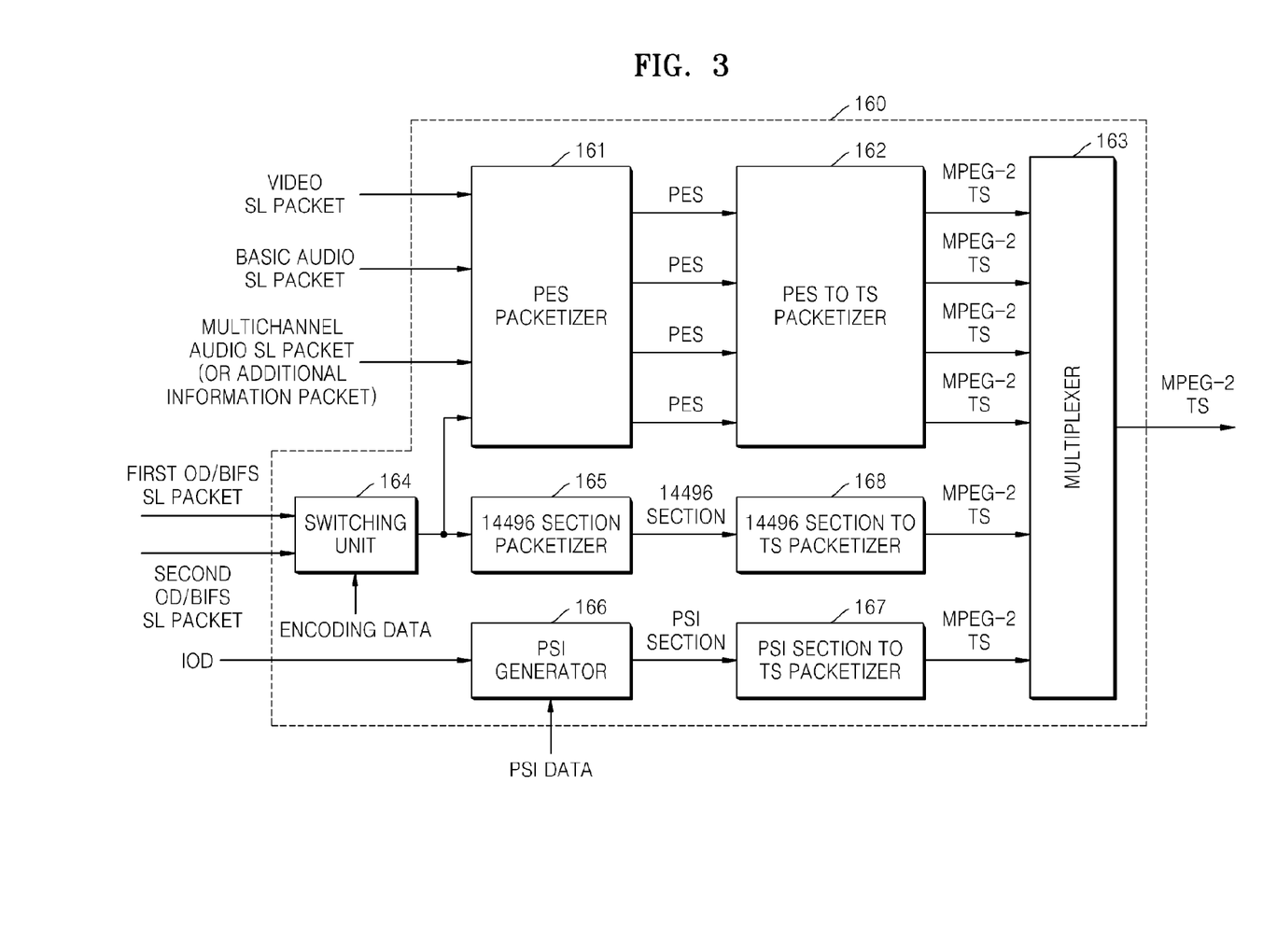
FIG. 3 is a block diagram illustrating a M4 over M2 module of FIG. 1, according to an exemplary embodiment of the present general inventive concept.

FIG. 3 is a block diagram illustrating the M4 over M2 module 160 of FIG. 1, according to an exemplary embodiment of the present general inventive concept. Referring to FIG. 3, the M4 over M2 module 160 includes a packetized elementary stream (PES) packetizer 161, a PES to TS packetizer 162, a multiplexer 163, a switching unit 164, a 14496 section packetizer 165, a program specific information (PSI) generator 166, a PSI section to TS packetizer 167, and a 14496 section to TS packetizer 168.

The switching unit 164 receives a first OD/BIFS SL packet regarding a basic audio stream and a second OD/BIFS SL packet regarding a multichannel audio stream from the OD/BIFS generating unit 130 to output the first OD/BIFS SL packet and the second OD/BIFS SL packet to the PES packetizer 161 or the 14496 section packetizer 165 according to encoding information of an SL packet. The PES packetizer 161 packetizes a video SL packet, a basic audio SL packet, and a multichannel audio SL packet (or additional information SL packet) output from the SL packetizing unit 150, and the first OD/BIFS SL packet and the second OD/BIFS SL packet received from the switching unit 164 to a PES and outputs the same to the PES to TS packetizer 162. A multichannel audio SL packet is packetized, for example, when the audio encoding unit 220 is used, or the additional information SL packet is packetized when the audio endocing unit 210 is used.

The 14496 section packetizer 165 packetizes the first OD/BIFS SL packet and the second OD/BIFS SL packet received from the switching unit 164 into a 14496 section and outputs the same to the 14496 to TS packetizer 168. The PSI generator 166 generates PSI including a program association table section (PA_section) and a program map table section (PM_section) and outputs the same to the PSI to TS packetizer 167.

The PES to TS packetizer 162 packetizes the PES packet into an MPEG-2 TS and outputs the same to the multiplexer 163. The PSI to TS packetizer 167 receives the PSI and packetizes the same into an MPEG-2 TS and outputs the same to the multiplexer 163. The multiplexer 163 multiplexes the received MPEG-2 TSs into one transport stream to output a multiplexed MPEG-2 TS.

Figure 4:
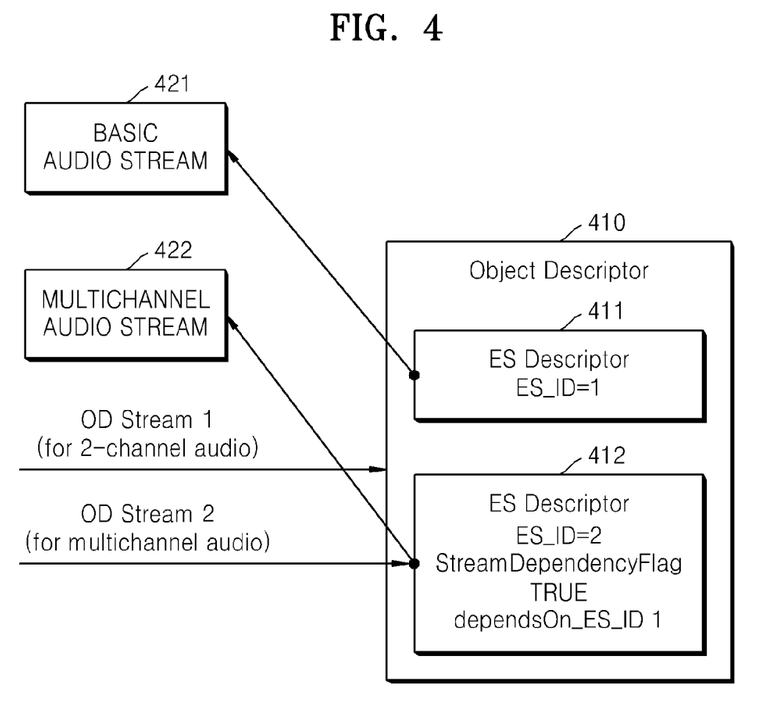
FIG. 4 is a reference diagram for explaining an object descriptor generated from a first data stream and a second data stream, according to an exemplary embodiment of the present general inventive concept.

FIG. 4 is a reference diagram for explaining an object descriptor (OD) generated from a first data stream and a second data stream, according to an exemplary embodiment of the present general inventive concept.

As described above, a first OD stream, which is a data stream describing property and position data of a basic audio stream, is generated in the first OD/BIFS generating unit 131, and a second OD stream, which is a data stream describing property and position data of a multichannel audio stream, is generated in the second OD/BIFS generating unit 132. As illustrated in FIG. 4, the first OD stream and the second OD stream are independent streams. A first elementary stream descriptor (ES_ID=1) 411 representing property and position data of a basic audio stream 421 is included in the first OD stream, and a second elementary stream descriptor (ES_ID=2) 412 representing property and position data of a multichannel audio stream 422 is included in the second OD stream.

The second elementary stream descriptor 412 included in the second OD stream is subordinate to the first elementary stream descriptor 411 included in the first OD stream. The subordinate relation may be defined by setting a flag "StreamDependencyFlag" included in the second elementary stream descriptor 412 as "True" and by setting a flag "dependsOn_ES_ID 1" to describe that the second elementary stream is subordinate to the first elementary stream descriptor which has a value of ES_ID=1. The first elementary stream descriptor 411 and the second elementary descriptor 412, which respectively have the relationship of master and servant, are combined with each other, thereby generating one object descriptor 410 regarding an audio object.

Figure 5:
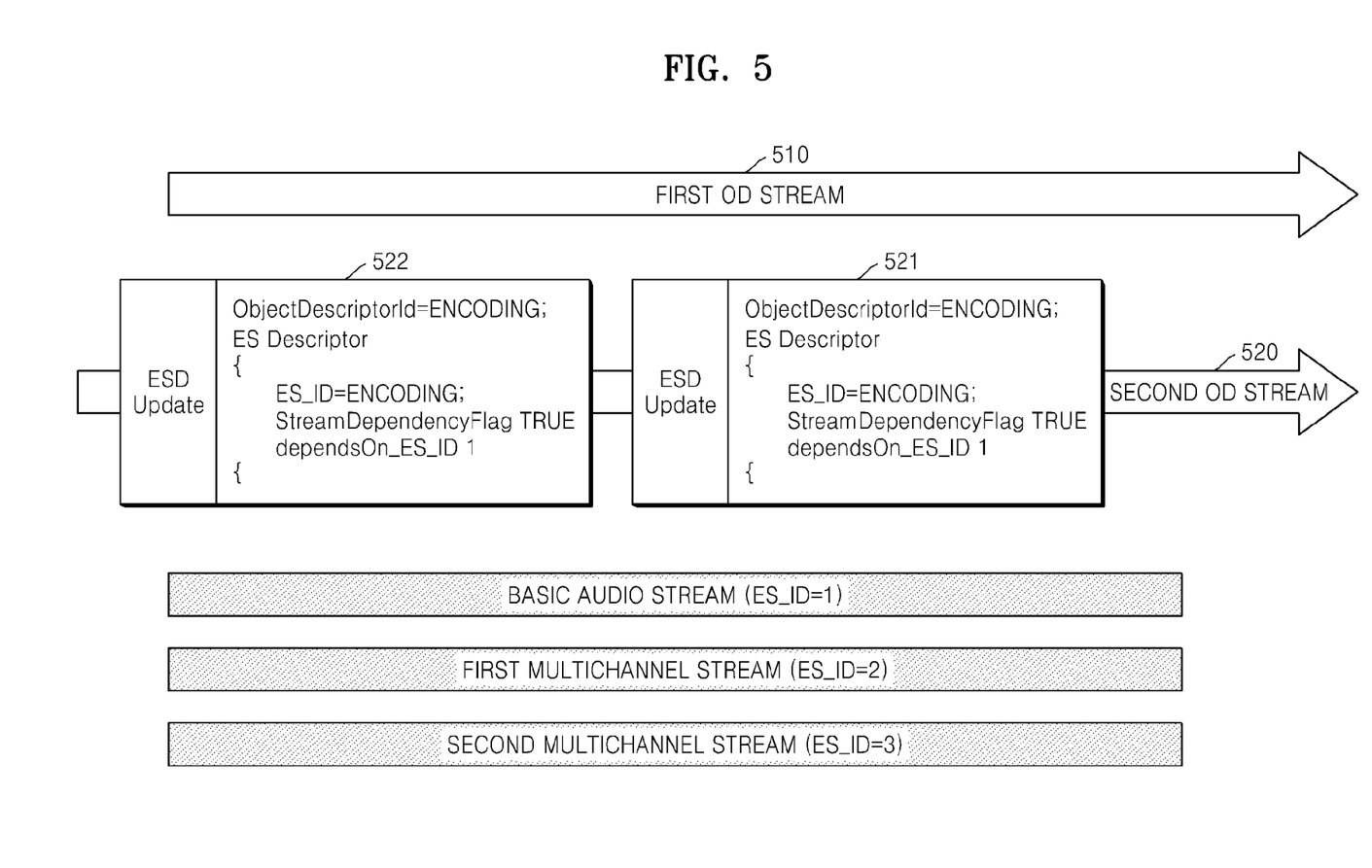
FIG. 5 is a reference diagram for describing a process of generating an object descriptor from a first data stream and an encoded second data stream, according to another exemplary embodiment of the present general inventive concept.

FIG. 5 is a reference diagram for describing a process of generating an object descriptor from a first data stream and an encrypted second data stream, according to another exemplary embodiment of the present general inventive concept.

Referring to FIG. 5, elementary stream descriptors 521 and 522 included in a second OD stream 520 are encrypted via a predetermined encrypting unit. Encrypting of the elementary stream descriptors 521 and 522 included in the second OD stream 520 may be conducted in each layer. For example, in each operation of the second OD/BIFS generating unit 132, the SL packetizing unit 150, and the M4 over M2 module 160, an encrypting unit may be included to encrypt the elementary stream descriptors 521 and 522 included in the second OD stream.

As described above, when the elementary stream descriptors 521 and 522 included in the second OS stream 520 are encrypted and transmitted, a receiver may not be able to decrypt the elementary streams 521 and 522 included in the second OS stream 520 without an encrypting key. Accordingly, the receiver requests the transmitting apparatus 100 for an encrypting key, and a predetermined authentication unit 170 included in the transmitting unit 100 determines a user right of a receiving apparatus that has requested an encrypting key and transmits the encrypting key stored in a storage unit therein to an authenticated receiving apparatus. The receiving apparatus decrypts the elementary stream descriptors 521 and 522 included in the second OD stream 520 by using a transmitted encrypting key to extract property and position data of a multichannel audio stream, thereby decoding a multichannel audio signal.

According to another exemplary embodiment of the present general inventive concept, the elementary stream descriptors 521 and 522 included in the second OS stream 520 may include property and position data regarding different multichannel audio streams. For example, the elementary stream descriptor 521 may include data on a first multichannel audio stream which has a value of ES_ID=2, and the elementary stream descriptor 522 may include data on a second multichannel audio stream having a value of ES_ID=3. When the elementary stream descriptors 521 and 522 included in the second OD stream 520 include data on different multiple channel audio streams as described above, various services may be provided. For example, a 64 kbps stereo signal may be provided as a basic audio stream, and a free multichannel audio signal may be provided as a first multichannel audio stream, and a high quality multichannel audio signal may be provided only to users who have paid a predetermined fee as a second multichannel audio stream. In this case, an elementary stream descriptor including property and position data of the second multichannel audio stream is encrypted, and an encrypting key is provided only to a receiving apparatus of a user who has paid a predetermined fee, so as to restore the second multichannel audio stream. In a receiving apparatus which is not capable of reproducing a multichannel audio stream, a stereo signal is restored by using just the data of a basic audio stream, and in a receiving apparatus that can use a multichannel audio signal, a multichannel audio signal may be restored by using the basic audio stream and the first multichannel audio signal.

Figure 6:
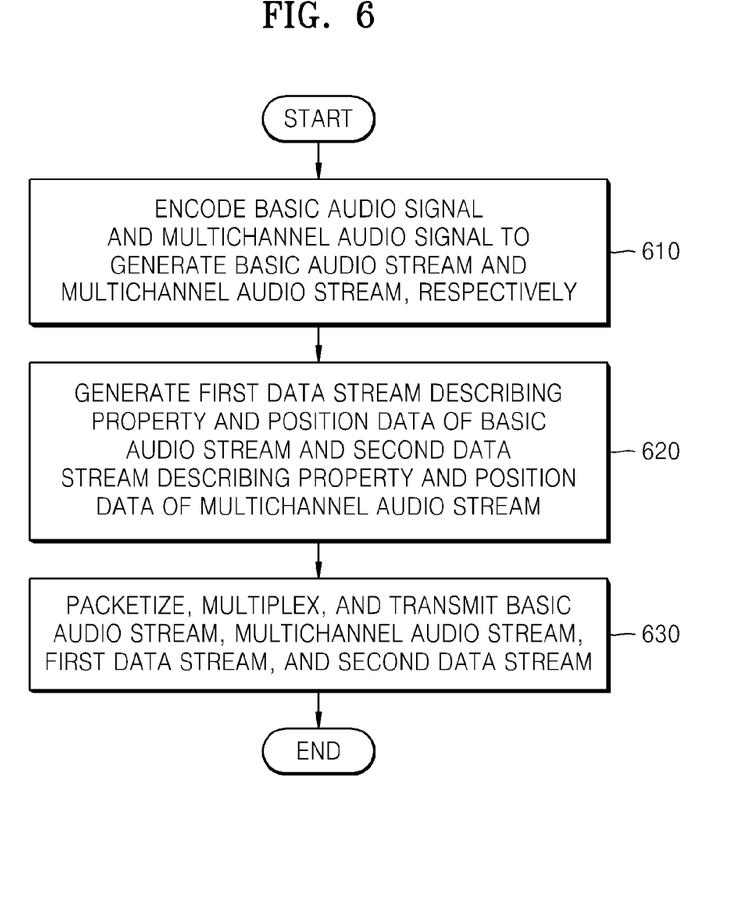
FIG. 6 is a flowchart illustrating a method of transmitting digital multimedia broadcasting data, according to an exemplary embodiment of the present general inventive concept.

FIG. 6 is a flowchart illustrating a method of transmitting digital multimedia broadcasting data, according to an exemplary embodiment of the present general inventive concept.

Referring to FIG. 6, in operation 610, a basic audio signal and a multichannel audio signal are encoded, thereby generating a basic audio stream and a multichannel audio stream, respectively. As described above, the basic audio stream may be generated by down-mixing a multichannel audio signal (e.g., see FIG. 2A) or by encoding an original stereo signal (e.g., see FIG. 2B). Also, the multichannel audio stream may be generated by encoding additional information for restoring a stereo signal to a multichannel audio signal (e.g., see FIG. 2A) or by encoding an original multichannel audio signal (e.g., see FIG. 2B).

In operation 620, a first data stream describing property and position data of the basic audio stream and a second data stream describing property and position data of the multichannel audio stream are generated. The first data stream and the second data stream are object descriptor streams and are generated as independent object descriptor streams, and a second elementary stream descriptor (ESD) included in the second data stream is set to be subordinate to a first ESD included in the first data stream so as to describe one audio object.

In operation 630, the basic audio stream, the multichannel audio stream, the first data stream, and the second data stream are packetized, multiplexed and transmitted.

Figure 7:
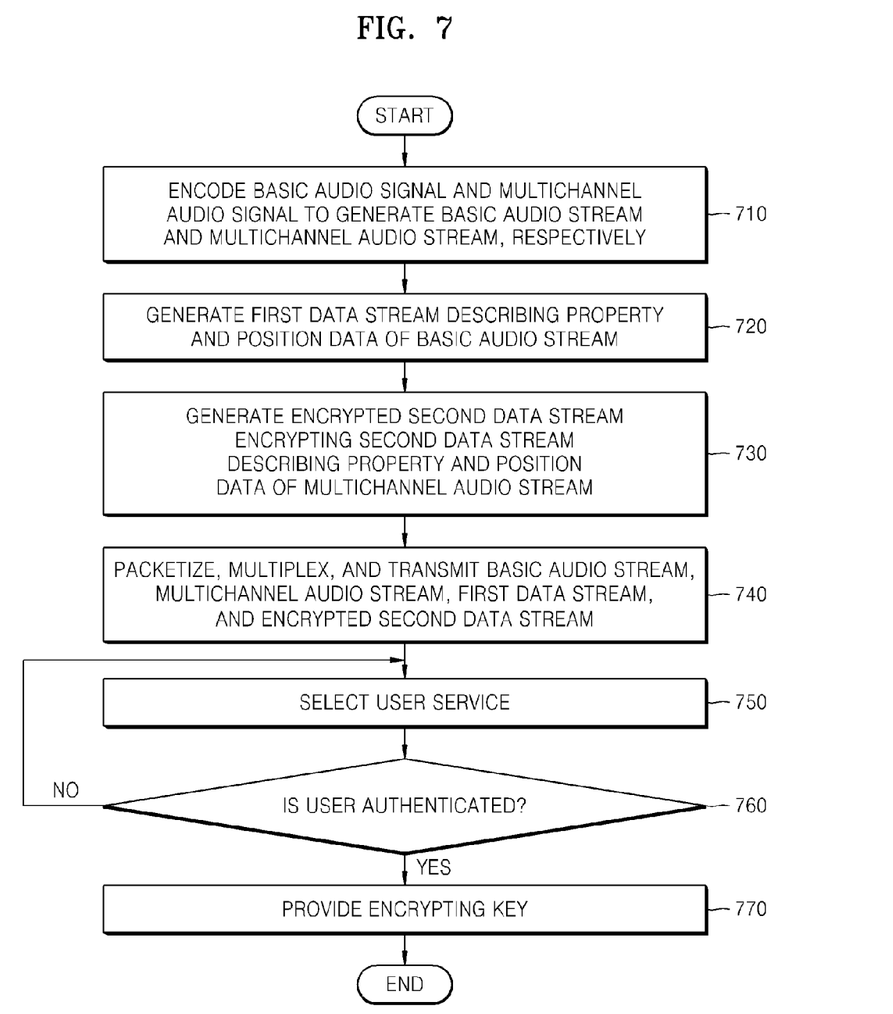
FIG. 7 is a flowchart illustrating a method of transmitting digital multimedia broadcasting data, according to another exemplary embodiment of the present general inventive concept.

FIG. 7 is a flowchart illustrating a method of transmitting digital multimedia broadcasting data, according to another exemplary embodiment of the present general inventive concept.

Referring to FIG. 7, in operation 710, a basic audio signal and a multichannel audio signal are encoded, thereby generating a basic audio stream and a multichannel audio stream, respectively.

In operation 720, a first data stream describing property and position data of the basic audio stream is generated.

In operation 730, a second data stream describing property and position data of the multichannel audio stream is generated and encrypted, thereby generating an encrypted second data stream. As described above, encryption of a data stream may be performed in each layer.

In operation 740, the basic audio stream, the multichannel audio stream, the first data stream, and the encrypted second data stream are packetized, multiplexed and transmitted.

In operation 750, a user at the side of a receiving apparatus that has received the encrypted second data stream selects an available audio service, and provides data on the selected audio service to a transmitting apparatus. As described with reference to FIG. 6, when the receiving apparatus of the user wants to use a second multichannel audio service, the user sends a request for an encrypting key to the transmitting apparatus in order to decrypt an elementary stream descriptor encrypted in the second OD stream describing property and position data of the second multichannel audio stream.

In operation 760, a predetermined authentication unit included in the transmitting apparatus determines whether the user who has requested the encrypting key is an authenticated user, and in operation 770, the encrypting key is provided to the receiving apparatus of the authenticated user. The receiving apparatus which has received the encrypting key decrypts the second data stream, and may decode a multichannel audio signal by using the decrypted second data stream.

Figure 8:
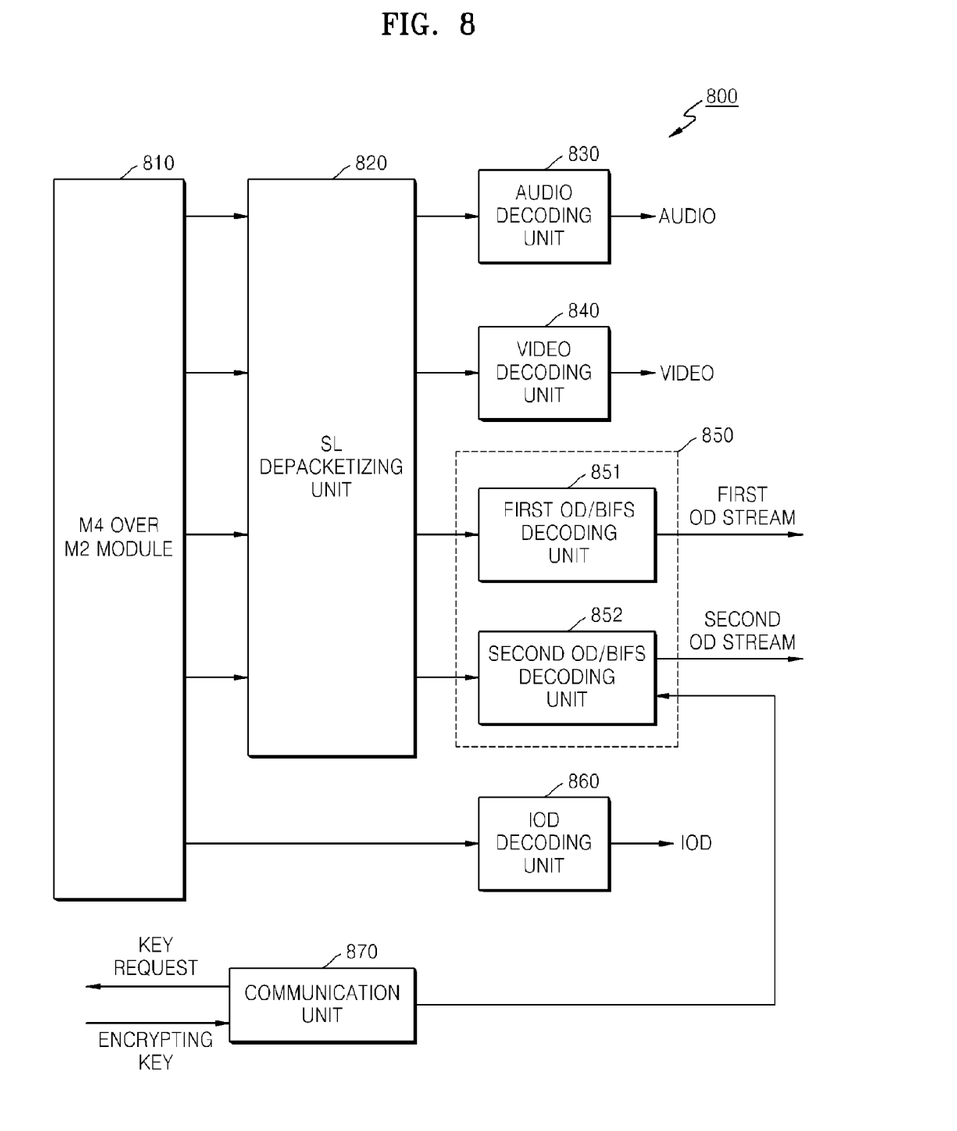
FIG. 8 is a block diagram illustrating an apparatus for receiving digital multimedia broadcasting data, according to an exemplary embodiment of the present general inventive concept.

FIG. 8 is a block diagram illustrating a receiving apparatus 800 for receiving digital multimedia broadcasting data, according to an exemplary embodiment of the present general inventive concept.

Referring to FIG. 8, the receiving apparatus 800 for receiving digital multimedia broadcasting includes an M4 over M2 module 810, an SL depacketizing unit 820, an audio decoding unit 830, a video decoding unit 840, an OD/BIFS decoding unit 850, an IOD decoding unit 860, and a communication unit 870.

The M4 over M2 module 810 demultiplexes from a MPEG-2 TS stream a packetized basic audio signal and a multichannel audio signal, a packetized video signal, and packetized first and second data streams, thereby outputting a basic audio SL packet, a multichannel audio SL packet, a video SL packet, a first data stream SL packet, and a second data stream SL packet.

Figure 9:
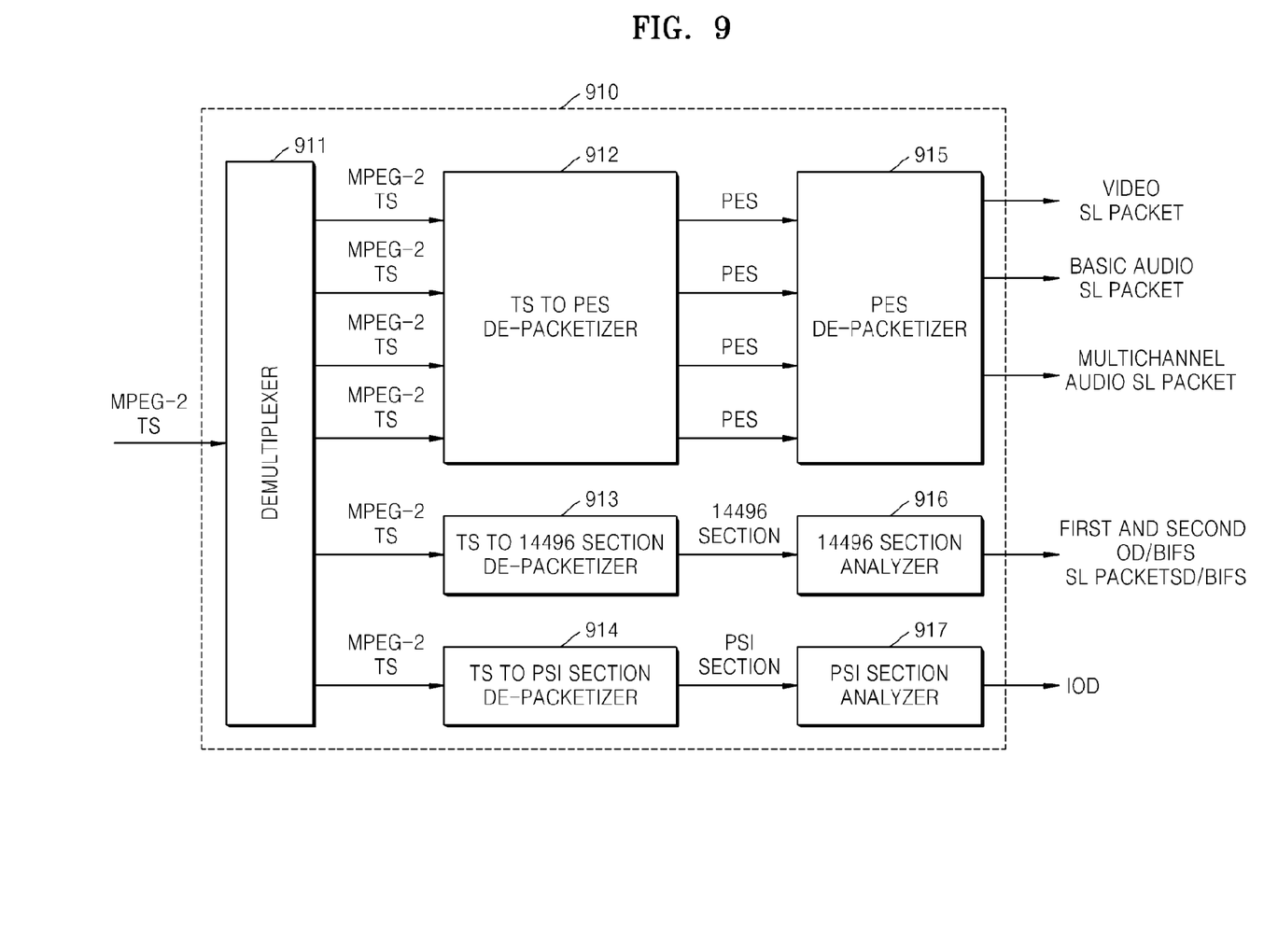
FIG. 9 is a block diagram illustrating an M4 over M2 module of FIG. 8, according to an exemplary embodiment of the present general inventive concept.

FIG. 9 is a block diagram illustrating the M4 over M2 module 810 of FIG. 8, according to an exemplary embodiment of the present general inventive concept.

Referring to FIG. 9, the M4 over M2 module 910 includes a demultiplexer 911, a TS to PES de-packetizer 912, a TS to 14496 section depacketizer 913, a TS to PSI section de-packetizer 914, a PES de-packetizer 915, a 14496 section analyzer 916, and a PSI section analyzer 917.

The demultiplexer 911 demultiplexes a multiplexed MPEG-2 TS into a single MPEG-2 TS regarding a basic audio, a multichannel audio, a video, a first data stream, and a second data stream and outputs the same. The TS to PES de-packetizer 912 receives an MPEG-2 TS of the basic audio, the multichannel audio, and the video, and depacketizes each of them into a PES packet. The PES de-packetizer 915 depacketizes the basic audio, the multichannel audio, and the video, which are each depacketized by the TS to PES de-packetizer 912 into a PES packet, into an SL packet, thereby outputting a basic audio SL packet, a multichannel audio SL packet, and a video SL packet.

The TS to 14496 section de-packetizer 913 receives a MPEG-2 TS of a 14496 section and depacketizes the same into a 14496 section and outputs the same. The TS to PSI section de-packetizer 914 receives an MPEG-2 TS of a PSI and depacketizes the same into a PAT section and a PMT section and outputs the same. The 14496 section analyzer 916 extracts an SL packet of the first data stream and the second data stream from the input 14496 section and outputs the same. The PSI section analyzer 917 receives the PAT section and the PMT section to extract IOD data and outputs the same.

Referring to FIG. 8 again, the SL depacketizing unit 820 respectively depacketizes the basic audio SL packet, the multichannel audio SL packet, the video SL packet, the first data stream SL packet, and the second data stream SL packet into an encoding stream and outputs the same.

The OD/BIFS decoding unit 850 includes a first OD/BIFS decoding unit 851 that decodes a first data stream describing property and position data of a basic audio stream and a second OD/BIFS decoding unit 852 that decodes a second data stream describing property and position data of a multichannel audio stream. As described above, the second elementary stream descriptor is constructed to be subordinate to a first elementary stream descriptor included in the first OD stream, and thus an object descriptor regarding one audio object may be generated by combining the first OD stream and the second OD stream.

If the second data stream is encrypted, the receiving apparatus sends a request for an encrypting key needed for decrypting the encrypted second data stream to the transmitting apparatus via a predetermined communication unit 870 included in the receiving apparatus, and decrypts the encrypted second data stream using a predetermined decrypting unit.

When an object descriptor regarding an audio object is generated by the OD/BIFS decoding unit 850, the audio decoding unit 830 performs decoding regarding a basic audio stream and a multimedia audio stream with reference to the property and position data of the basic audio stream included in the object descriptor. If the basic audio stream is encoded into a stereo signal and the multichannel audio stream is encoded into additional information for extending the stereo signal into a multichannel audio signal (e.g., see FIG. 2A), the audio decoding unit 830 first decodes the stereo signal, and up-mixes the decoded stereo signal by using the additional information, thereby decoding the multichannel audio signal. If the basic audio stream and the multichannel audio stream are individually encoded and transmitted (e.g., see FIG. 2B), the audio decoding unit 830 respectively decodes the basic audio stream and the multichannel audio stream, thereby restoring the basic audio signal and the multichannel audio signal.

The video decoding unit 840 decodes the video stream, and the IOD decoding unit 860 decodes the IOD data and outputs the same. The decoded IOD data may be used in extracting the above-described OD stream data.

Figure 10:
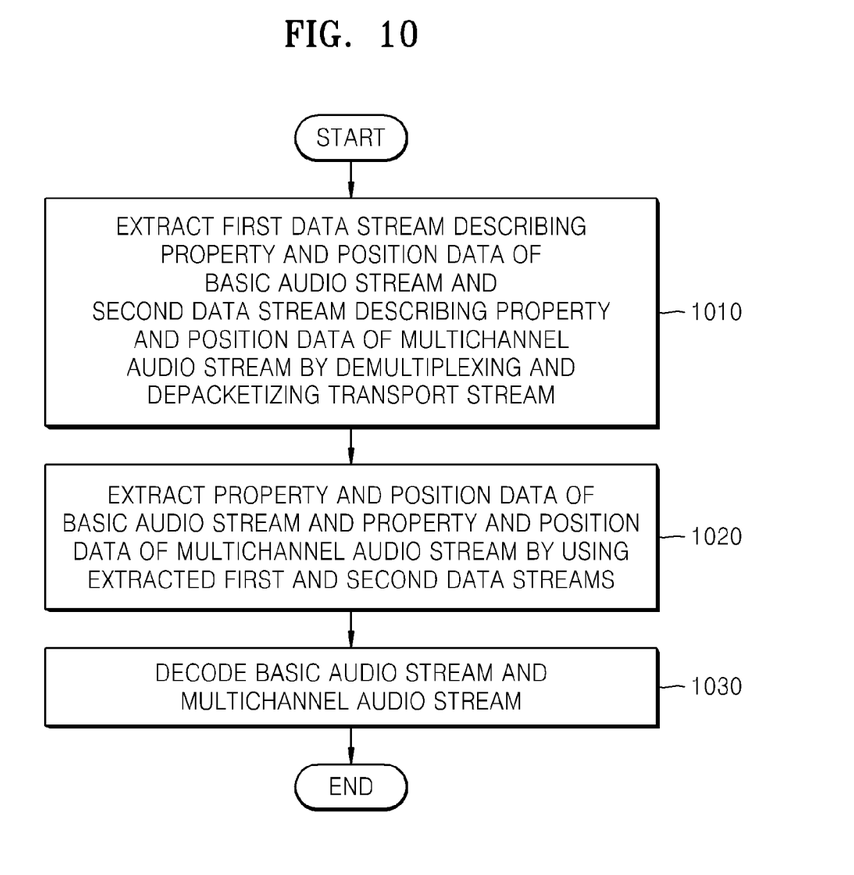
FIG. 10 is a flowchart illustrating a method of receiving digital multimedia broadcasting data, according to an exemplary embodiment of the present general inventive concept.

FIG. 10 is a flowchart illustrating a method of receiving digital multimedia broadcasting data, according to an exemplary embodiment of the present general inventive concept.

Referring to FIG. 10, in operation 1010, a transport stream is demultiplexed and depacketized to extract a first data stream describing property and position data of a basic audio stream and a second data stream describing property and position data of a multichannel audio stream.

In operation 1020, the first data stream and the second data stream are decoded to extract the property and position data of the basic audio stream and the property and position data of the multichannel audio stream.

In operation 1030, by using the property and position data of the extracted basic audio stream, and the property and position data of the multichannel audio stream, the basic audio stream and the multichannel audio stream are decoded. The basic audio stream includes data on a stereo signal. When the multichannel audio stream includes additional information for extending a stereo signal to a multichannel audio signal, the stereo signal may be up-mixed into a multichannel audio signal and the signals of each of the up-mixed channels may be adjusted by using the intensity and phase data of each channel included in the additional information, thereby decoding the multichannel audio signal.

Figure 11:
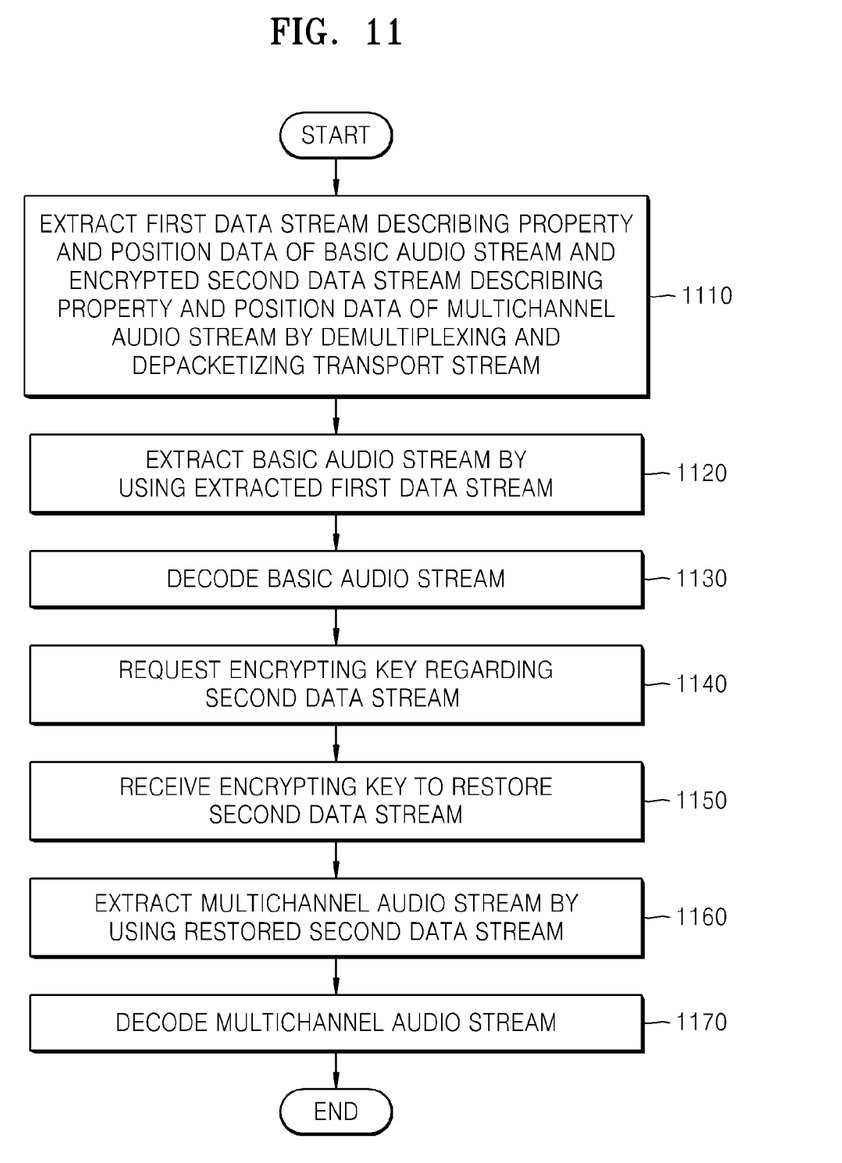
FIG. 11 is a flowchart illustrating a method of receiving digital multimedia broadcasting data, according to another exemplary embodiment of the present general inventive concept.

FIG. 11 is a flowchart illustrating a method of receiving digital multimedia broadcasting data, according to another exemplary embodiment of the present general inventive concept.

Referring to FIG. 11, in operation 1110, a transport stream is demultiplexed and depacketized to extract a first data stream describing property and position data of a basic audio stream and an encrypted second data stream describing property and position data of a multichannel audio stream.

In operation 1120, by using the property and position data of the basic audio stream included in the extracted first data stream, a basic audio stream is extracted, and in operation 1130, the extracted basic audio stream is decoded.

In operation 1140, in order to decrypt the encrypted second data stream, an encrypting key is requested by a receiving apparatus from a transmitting apparatus. In operation 1150, if a receiving apparatus is authenticated, the transmitting apparatus transmits the encrypting key, and the authenticated receiving apparatus decodes the encrypted second data stream by using the received encrypting key to generate a restored second data stream.

In operation 1160, by using the restored second data stream, a multichannel audio stream is extracted, and in operation 1170, the multichannel audio stream is decoded.

The exemplary embodiments of the present general inventive concept can be written as computer programs embodied on a computer readable recording medium and can be implemented in general-use digital computers that execute the programs using the computer readable recording medium. Examples of the computer readable recording medium include magnetic storage media (e.g., ROM, floppy disks, hard disks, etc.), or optical recording media (e.g., CD-ROMs, or DVDs).

While the present general inventive concept has been particularly shown and described with reference to exemplary embodiments thereof, it will be understood by those skilled in the art that various changes in form and details may be made therein without departing from the spirit and scope of the present general inventive concept as defined by the appended claims. The exemplary embodiments should be considered in descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:
1. A transmitting apparatus which transmits digital multimedia broadcasting data, comprising:
  an audio encoder which is configured to encode a basic audio signal and a multichannel audio signal to generate a basic audio stream and a multichannel audio stream;
  a data stream processor which is configured to generate a first data stream describing property and position data of the basic audio stream and a second data stream describing property and position data of the multichannel audio stream; and
  a transmitter which is configured to packetizes packetize, multiplexes multiplex and transmit the basic audio stream, the multichannel audio stream, the first data stream, and the second data stream,
  wherein the first data stream comprises a first elementary stream descriptor (ESD) regarding the basic audio stream and the second data stream comprises a second ESD regarding the multichannel audio stream, wherein the first ESD and the second ESD are combined with each other to generate one object descriptor regarding a single audio object, and wherein the audio encoder, the data stream processor, and the transmitter are implemented using a physical processor and memory.

2. The transmitting apparatus of claim 1, wherein the first data stream and the second data stream comprise object description streams.

3. The transmitting apparatus of claim 1, wherein the data stream processor is configured to generate the first data stream and the second data stream as independent streams.

4. The transmitting apparatus of claim 1, wherein
the second ESD included in the second data stream is set to be subordinate to the first ESD.

5. The transmitting apparatus of claim 1, wherein the basic audio signal comprises a stereo signal, and the multichannel audio signal comprises additional information for extending the stereo signal to a multichannel signal.

6. The transmitting apparatus of claim 1, further comprising:
an encryptor which is configured to encrypt the second data stream; and
an authenticator which is configured to determine whether the encrypted second data stream is allowed for use or not and transmit encrypting key data required for decrypting the encrypted second data stream to an authenticated user,
wherein the encryptor and the authenticator are implemented using a physical processor and memory.

7. The transmitting apparatus of claim 1, wherein the audio encoder comprises:
a down mixer which is configured to receive a multichannel audio signal and down-mixes the multichannel audio signal to a stereo signal;
a stereo encoder which is configured to encode the stereo signal to generate the basic audio stream; and
an additional information processor which is configured to encode additional information used for restoring the multichannel audio signal from the stereo signal,
wherein the multichannel audio stream is the encoded additional information,
wherein the down mixer, the stereo encoder and the additional information processor are implemented using a physical processor and memory.

8. The transmitting apparatus of claim 7, wherein the additional information includes information on an intensity of the down-mixed multichannel audio signals and information on difference in phases between the down-mixed multichannel audio signals.

9. The transmitting apparatus of claim 1, wherein the audio encoder comprises:
a basic audio encoder which is configured to encode a basic audio signal to generate the basic audio stream; and
a multichannel audio encoder which is configured to encode a multichannel signal to generate the multichannel audio stream,
wherein the basic audio stream and the multichannel audio stream are individually encoded and transmitted by the audio encoder, and
wherein the basic audio encoder and the multichannel audio encoder are implemented using a physical processor and memory.

10. A computer-implemented method of transmitting digital multimedia broadcasting data, the method comprising:
encoding a basic audio signal and a multichannel audio signal to generate a basic audio stream and a multichannel audio stream;
generating a first data stream describing property and position data of the basic audio stream and a second data stream describing property and position data of the multichannel audio stream; and
packetizing, multiplexing, and transmitting the basic audio stream, the multichannel audio stream, the first data stream, and the second data stream,
wherein the first data stream comprises a first elementary stream descriptor (ESD) regarding the basic audio stream and the second data stream comprises a second ESD regarding the multichannel audio stream, and
wherein the first ESD and the second ESD are combined with each other to generate one object descriptor regarding a single audio object.

11. The method of claim 10, wherein the first data stream and the second data stream comprise object description streams.

12. The method of claim 10, wherein the first data stream and the second data stream are generated as independent streams.

13. The method of claim 10, wherein
the second ESD is set to be subordinate to the first ESD.

14. The method of claim 10, wherein the basic audio signal comprises a stereo signal, and the multichannel audio signal comprises additional information for extending the stereo signal to a multichannel signal.

15. The method of claim 10, further comprising:
encrypting the second data stream;
determining whether the encrypted second data stream is permitted to be used, when a request for encrypting key data to decode the second data stream is received; and
transmitting the encrypting key data required for decrypting the encrypted second data stream to an authenticated user.

16. A receiving apparatus which receives digital multimedia broadcasting data, the apparatus comprising:
a receiver which is configured to receive a transport stream and extract a first data stream describing property and position data of a basic audio stream and a second data stream describing property and position data of a multichannel audio stream by demultiplexing and depacketizing the transport stream;
a data stream decoder which is configured to decode the first data stream and the second data stream to extract property and position data of the basic audio stream and property and position data of the multichannel audio stream; and
an audio decoder which is configured to decode the basic audio stream and the multichannel audio stream by using the property and position data of the basic audio stream and the property and position data of the multichannel audio stream,
wherein the first data stream comprises a first elementary stream descriptor (ESD) regarding the basic audio stream and the second data stream comprises a second ESD regarding the multichannel audio stream,
wherein the first ESD and the second ESD are combined with each other to generate one object descriptor regarding a single audio object, and wherein the audio decoder, the data stream decoder, and the receiver are implemented using a physical processor and memory.

17. The receiving apparatus of claim 16, wherein the transport stream includes a packetized basic audio signal and a multichannel audio signal, a packetized video signal, and packetized first and second data streams.

18. The receiving apparatus of claim 16, wherein the first data stream and the second data stream comprise object description streams.

19. The receiving apparatus of claim 16, wherein the first data stream and the second data stream are generated as independent streams.

20. The receiving apparatus of claim 16, wherein
the second ESD is set to be subordinate to the first ESD.

21. The receiving apparatus of claim 16, wherein the basic audio stream comprises a stereo signal, and the multichannel audio stream comprises additional information for extending the stereo signal to a multichannel signal.

22. The receiving apparatus of claim 16, wherein the second data stream is transmitted in an encrypted state, and
the receiving apparatus further comprises:
  a communicator which is configured to request and receive encrypting key data required for decrypting the second data stream encrypted in a transmitting apparatus which transmits the transport stream; and
  a decryptor which is configured to decrypt the encrypted second data stream by using the encrypting key,
  wherein the communicator and the decryptor are implemented using a physical processor and memory.

23. A computer-implemented method of receiving digital multimedia broadcasting data, the method comprising:
  extracting from a transport stream a first data stream describing property and position data of a basic stream and a second data stream describing property and position data of a multichannel audio stream by demultiplexing and depacketizing the transport stream;
  decoding the first data stream and the second data stream to extract property and position data of the basic audio stream and property and position data of the multichannel audio stream; and
  decoding the basic audio stream and the multichannel audio stream by using the property and position data of the basic audio stream and the property and position data of the multichannel audio stream,
  wherein the first data stream comprises a first elementary stream descriptor (ESD) regarding the basic audio stream and the second data stream comprises a second ESD regarding the multichannel audio stream, and
  wherein the first ESD and the second ESD are combined with each other to generate one object descriptor regarding a single audio object.

24. The method of claim 23, wherein the first data stream and the second data stream comprise object description streams.

25. The method of claim 23, wherein the first data stream and the second data stream are generated as independent streams.

26. The method of claim 23, wherein
the second ESD is set to be subordinate to the first ESD.

27. The method of claim 23, wherein the basic audio stream comprises a stereo signal, and the multichannel audio stream comprises additional information for extending the stereo signal to a multichannel signal.

28. The method of claim 23, wherein the second data stream is transmitted in an encrypted state, and
the method further comprises:
  requesting and receiving encrypting key data required for decrypting the second data stream encrypted in a transmitting apparatus which transmits the transport stream; and
  decrypting the encrypted second data stream by using the encrypting key.

* * * * *